UNITED STATES PATENT OFFICE.

WILHELM HERMANN HOFMANN, OF HAMBURG, GERMANY.

PROCESS FOR DEODORIZING OLEIC AND FATTY ACIDS DERIVED FROM TRAIN OR FISH OILS.

1,106,509.  Specification of Letters Patent.  Patented Aug. 11, 1914.

No Drawing.  Application filed September 23, 1913. Serial No. 791,285.

*To all whom it may concern:*

Be it known that I, WILHELM HERMANN HOFMANN, a subject of the German Emperor, and resident of Hamburg, in the German Empire, have invented a certain new and useful Process for Deodorizing Oleic and Fatty Acids Derived from Train or Fish Oils, of which the following is a specification.

The oleic and fatty acids obtained from train- or fish-oils by the processes hitherto known could not be used for a great number of purposes on account of their strong and very disagreeable smell which also could not be durably covered by perfumes. According to my present invention, however, it is possible to obtain nearly wholly deodorized oleic and fatty acids from fish-oils.

The products of my new process are preferably intended for manufacturing soaps. The soaps produced with them indeed have a typical smell but it is easy to durably cover it by perfumes of any kind, while soaps manufactured with fatty acids obtained from train- and fish-oils according to the known processes, in spite of being intensively perfumed, already after a few days show a clear disagreeable and fishy odor.

The process according to my present invention is performed by applying resins or resinous substances in the following manner: I decompose train- or fish-oils as highly as possible by means of one of the usual methods for decomposing fat into glycerin and oleic and fatty acids and hereupon I heat them to about 110° centigrade for the purpose of drying. Then I add resin which is dissolved in a small quantity of oleic or fatty acid of the same kind, in order to be mixed with the bulk of fat more easily and homogeneously. After this I cause about 10% concentrated sulfuric acid of 66° Bé. to act slowly upon the hot mixture while being continuously agitated. The temperature should not be allowed to exceed 120° centigrade, as otherwise the reaction would be too violent. During the reaction, considerable quantities of sulfurous acid are produced. It being finished, I boil the formed fatty sulfuric acid with 30 to 50% of water for several hours. Then the water gradually coloring dark brown is drawn off and replaced by fresh water. The boiling should last again for several hours. Afterward I add a concentrated solution of sodium-chlorid for destroying the formed emulsion and neutralize with a highly alkaline solution of sodium-chlorid. The product thus obtained is black-brown and is distilled in vacuum with superheated steam before using it.

My present invention may be executed for instance in the following way: 10000 parts of oleic or fatty acids derived from train-oil are heated to 110° centigrade in a suitable vessel which may be indirectly heated and stirred, in order to remove the water. Then 200 parts of pine-resin are added, which, for the purpose of better distribution, had been melted before with about 200 parts of the same fatty acid. Into the hot mixture 1500 parts of concentrated sulfuric acid of 66° Bé. are caused to flow, the temperature not being allowed to rise above 125° centigrade, as a too violent reaction would cause the vessel to froth over. The contents are now stirred until no longer sulfurous acid is formed. The mixture meanwhile cooled down to about 80° centigrade is now caused to flow into a tub containing about 3 to 5000 parts of water, and is boiled therein for 10 hours. The very acid water easily separating itself is removed and replaced by the same quantity of fresh water and again boiled for 10 hours. Hereby an emulsion is formed which is separated by a concentrated solution of sodium chlorid. After this separation the mixture is neutralized by means of a solution of sodium chlorid containing carbonate of soda, whereupon methylic orange is used as testing indicator. The so formed fatty acid which contains very much water is dried by heating it to about 110° centigrade and then distilled in vacuum by means of superheated steam.

I claim:

The herein described process for deodorizing oleic and fatty acids from train or fish oils which consists in mixing resin with the fatty acids and subjecting the mixture to the action of concentrated sulfuric acid.

WILHELM HERMANN HOFMANN.

Witnesses:
F. C. MAX KAEMPFF,
ERNEST H. L. MUMMENHOFF.